United States Patent
Man

(10) Patent No.: US 8,424,660 B2
(45) Date of Patent: Apr. 23, 2013

(54) FREE WHEEL, ESPECIALLY FOR A CRANK CVT

(75) Inventor: Laszlo Man, Ottersweier-Unzhurst (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/285,419

(22) Filed: Oct. 31, 2011

(65) Prior Publication Data

US 2012/0073927 A1    Mar. 29, 2012

Related U.S. Application Data

(63) Continuation of application No. PCT/DE2010/000689, filed on Jun. 17, 2010.

(30) Foreign Application Priority Data

Jul. 9, 2009    (DE) .......................... 10 2009 032 337

(51) Int. Cl.
     *F16D 41/07*      (2006.01)

(52) U.S. Cl.
     USPC ........................................ 192/45.1; 192/41 A

(58) Field of Classification Search .................. 192/45.1, 192/41 A, 45.2

See application file for complete search history.

(56) References Cited

U.S. PATENT DOCUMENTS

| 2,777,551 | A | | 1/1957 | Banker | |
| 2,881,886 | A | * | 4/1959 | Troendly et al. | 192/45.1 |
| 2,900,057 | A | * | 8/1959 | Schneider et al. | 192/45.1 |
| 2,901,072 | A | * | 8/1959 | Maurer et al. | 192/45.1 |
| 3,175,661 | A | * | 3/1965 | Maurer et al. | 192/45.1 |
| 3,730,316 | A | * | 5/1973 | Zimmer | 192/41 A |

FOREIGN PATENT DOCUMENTS

| DE | 1 814 968 A1 | 7/1970 |
| DE | 22 04 305 A1 | 8/1973 |
| DE | 6811650 B | 1/1974 |
| DE | 32 33 073 A1 | 10/1983 |
| DE | 40 32 915 A1 | 4/1992 |
| FR | 2 144 067 A5 | 2/1973 |

* cited by examiner

*Primary Examiner* — Rodney Bonck
(74) *Attorney, Agent, or Firm* — Lucas & Mercanti, LLP

(57) ABSTRACT

A free wheel, especially for a crank CVT, which has an inner ring, an outer ring that can rotate in at least one rotary direction in relation to the inner ring and is arranged radially around the inner ring, and a plurality of clamping bodies which have a head region and a foot region. The clamping bodies are arranged between the inner ring and the outer ring and can be subjected to the radially inwardly acting elastic force of a peripheral spring engaging in a spring groove, towards the inner ring. The guidance of the clamping bodies is carried out at the same time in the head region and in the foot region, and the clamping bodies are in the form of a cycloid in the head region and the foot region.

6 Claims, 3 Drawing Sheets

FREE WHEEL, ESPECIALLY FOR A CRANK CVT

CROSS-REFERENCE TO RELATED APPLICATIONS

This application is a continuation of PCT/DE2010/000689 filed Jun. 17, 2010, which in turn claims the priority of DE 10 2009 032 337.6 filed Jul. 9, 2009. The priority of both applications is hereby claimed and the applications are incorporated by reference herein.

FIELD OF THE INVENTION

The present invention relates to a freewheel, in particular for a crank-type CVT.

BACKGROUND OF THE INVENTION

A CVT is a uniform-motion transmission in which the ratio of the rotational speeds of the driving shaft and of the driven shaft, the transmission ratio, can assume an infinite number of values (stages) in a certain range. This may also include the standstill state or the rotational direction reversal of a shaft. The transmission of the movement takes place via a non-rigid coupling of components, the geometries of which determine the transmission action according to the lever principle. A change in transmission ratio is obtained by means of a change in said component geometries, which however at the same time cannot take place without a change in the geometries at the location of the component coupling.

Numerous freewheel devices for crank-type CVTs have, for this purpose, clamping bodies which are arranged between an inner ring, which is formed by a region of the drive output shaft, and an outer ring. Here, the surfaces of the outer ring and of the inner ring are coordinated with one another such that, in one direction of relative rotation between the inner ring and outer ring, the clamping bodies can block said rotation, such that the outer ring and the inner ring are rotated together. In the other direction of relative rotation between the outer ring and the inner ring, no blocking action is effected by the clamping bodies. The individual clamping bodies are loaded in the blocking direction, which may be realized by means of at least one spring element.

For example, documents DE 1814968 A, DE 6811650 B and DE 3233073 C2 disclose freewheel clutches having a multiplicity of tiltable clamping bodies which are spaced apart from one another and which are inserted between an outer ring 1 and an inner ring, wherein the clamping bodies are guided in a cage and are preloaded or held by means of an encircling spring, which imparts an inward loading, in the engagement or functional engagement direction. A rectilinearly running groove for receiving the spring is formed through the center of the clamping bodies.

The springs may take the form of an annular band spring, an annular groove spring or a spiral spring (worm spring), which in the latter case engages into worm spring grooves of the clamping bodies.

Also known are clamping body freewheels without a cage, in which the guidance of the tiltable clamping bodies is realized, as in a cageless needle-roller bearing, at the center of the clamping bodies for example by means of a meandering spring, wherein the clamping bodies bear against one another.

It is a disadvantage that, in particular in the case of cageless freewheels, the clamping bodies can undesirably rotate about their own axes under highly dynamic conditions, and the clamping function is thereby impaired.

SUMMARY OF THE INVENTION

The present invention relates to a freewheel, in particular for a crank-type CVT, without a cage, in which an undesired rotation of the clamping bodies is prevented.

The freewheel, in particular for a crank-type CVT, has an inner ring, an outer ring which is rotatable relative to the inner ring in at least one direction of rotation and which is arranged radially around the inner ring, and a plurality of clamping bodies which have a head region and a foot region and which are arranged between the inner ring and the outer ring and bear against one another and can be loaded in the direction of the inner ring by the radially inwardly acting spring force of an encircling spring which engages into a spring engagement groove, wherein according to the invention, the guidance of the clamping bodies is realized simultaneously both in the head region and also in the foot region, and the clamping bodies are of cycloidal form in the head region and foot region. The clamping bodies thereby have less freedom of movement and are driven by other clamping bodies even when the spring, which may be designed in particular as a meandering spring or worm spring, cannot push some clamping bodies properly into the clamping gap.

Here, in particular, at all operating points, there is a defined constant spacing between the head region and the foot region of adjacent clamping bodies in order to maintain a lubricating film (oil film).

Furthermore, the width of the clamping bodies in the head region is greater than the width thereof in the foot region, as a result of which, overall, there is more space in the circumferential direction for the rolling of the meandering spring in the clamping body groove. The space obtained in this way can be utilized for an improved spring engagement function.

As a result of the wider head region, in a freewheel direction of rotation, two guide points are formed between adjacent clamping bodies, and in the opposite direction of rotation, one impact point is formed between adjacent clamping bodies. Furthermore, it is advantageously the case that, in an impact situation, a lever arm which increases the uprighting moment on the clamping bodies is exerted on the clamping bodies by the spring, which lever arm is greater than the lever arm in the nominal contact region of the clamping bodies. In this way, the uprighting moment on the clamping bodies becomes larger. Furthermore, this also assists in ensuring that possible jamming of the clamping bodies as a result of the impact, and the adherence to one another by means of the lubricating oil, is better overcome.

The lever arm increase however must not act in the nominal contact region, in order to keep the drag torques low and efficiency high.

The spring engagement groove, in order to increase the lever arm in an impact situation, has a pressure surface for the spring, which pressure surface is substantially convexly curved in the freewheel direction and ends substantially straight in the damping region of the clamping bodies. Furthermore, the pressure surface of the spring engagement groove is inclined so as to slope downward radially inward in the direction of the inner ring in the freewheel direction.

As a result of the improved mutual guidance of the clamping bodies, even those clamping bodies which cannot be pushed into the clamping gap in a timely manner by the meandering spring on account of their unfavorable tolerance position are driven by the adjacent clamping bodies both at the head region and also at the foot region, and therefore the gripping function of the freewheel is improved and a rotation of the clamping bodies is prevented.

Also advantageous is the improved spring engagement as a result of the lever arm, which is increased in the impact situation, of the meandering spring, which lever arm facilitates the uprighting of the clamping bodies.

BRIEF DESCRIPTION OF THE DRAWINGS

The invention will be explained in more detail below on the basis of an exemplary embodiment and associated drawings, in which.

DETAILED DESCRIPTION OF THE INVENTION

Figure 1:
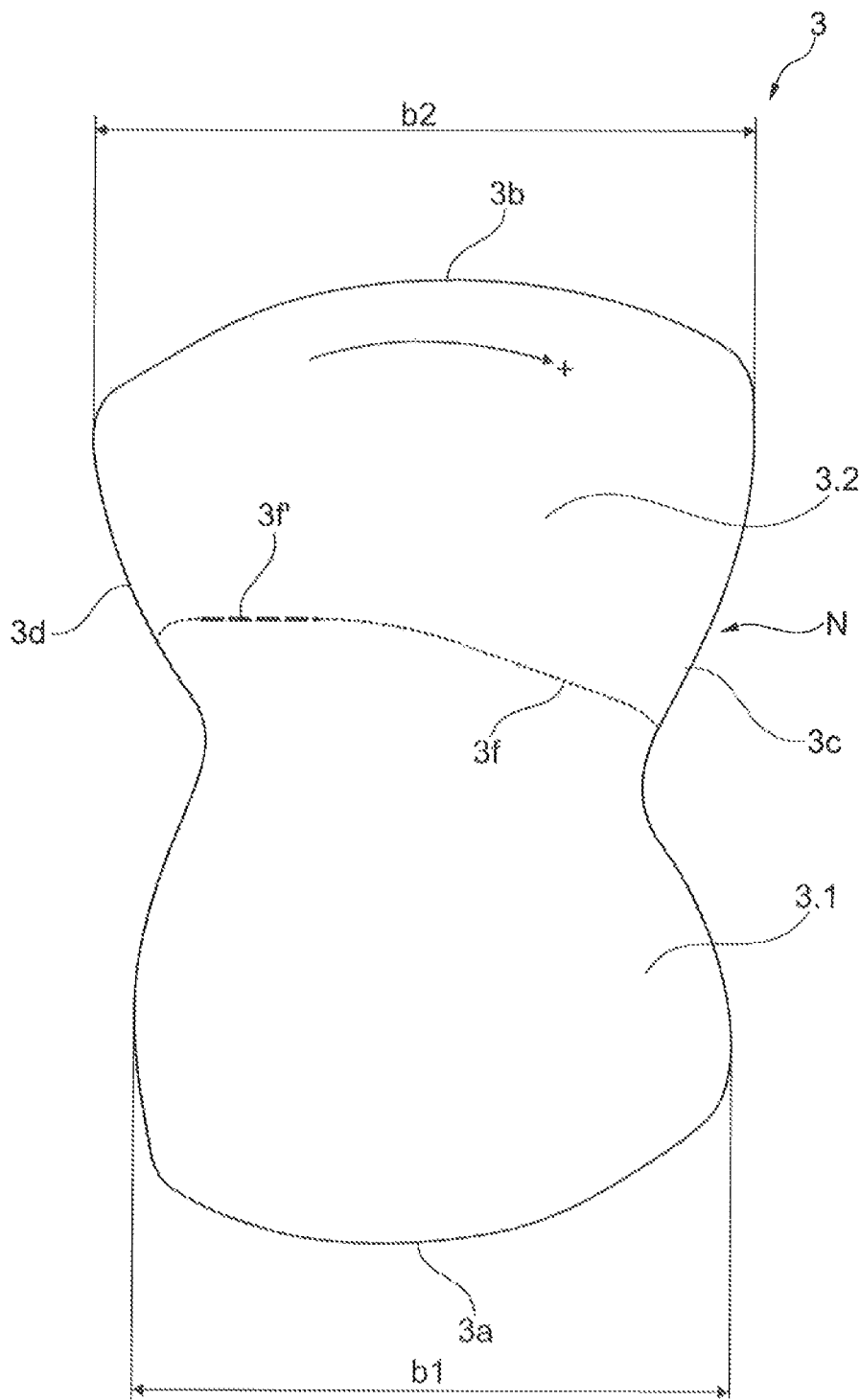
FIG. 1 shows the front view of a clamping body.

FIG. 1 shows the front view of a clamping body 3 having a foot region 3.1 and a head region 3.2, wherein the foot region 3.1 points with a first contact surface 3a in the direction of the inner ring (not illustrated here) and the head region 3.2 points with a second contact surface 3b in the direction of the outer ring (not illustrated here) of the freewheel.

The foot region 3.1 has a width b1 and the head region has a larger width b2 in relation thereto. A constriction (not indicated in any more detail) is formed in between.

In the pivoting direction, indicated by the arrow, of the clamping body 3 under impact loading (positive direction of rotation +), a first abutment surface 3c and, opposite the latter, a second abutment surface 3d are formed, which abutment surfaces point in the direction of the adjoining clamping bodies (not illustrated).

The clamping body 3 also has a spring engagement groove N (see FIGS. 3 and 4) which is open in the direction of the outer ring and which has a pressure surface 3 (illustrated here by dashed lines) against which acts a spring (not shown here), for example in the form of a meandering spring. The pressure surface 3f has, in the direction of the second abutment surface 3d, a region 3f' (shown by bold lines) which ends substantially straight in the damping region.

As a result of the radially inwardly directed spring action of the spring, the clamping elements are loaded in the direction of the inner ring. Here, the clamping elements 3 are pressed into a clamping gap of the inner ring (not illustrated).

Figure 2:
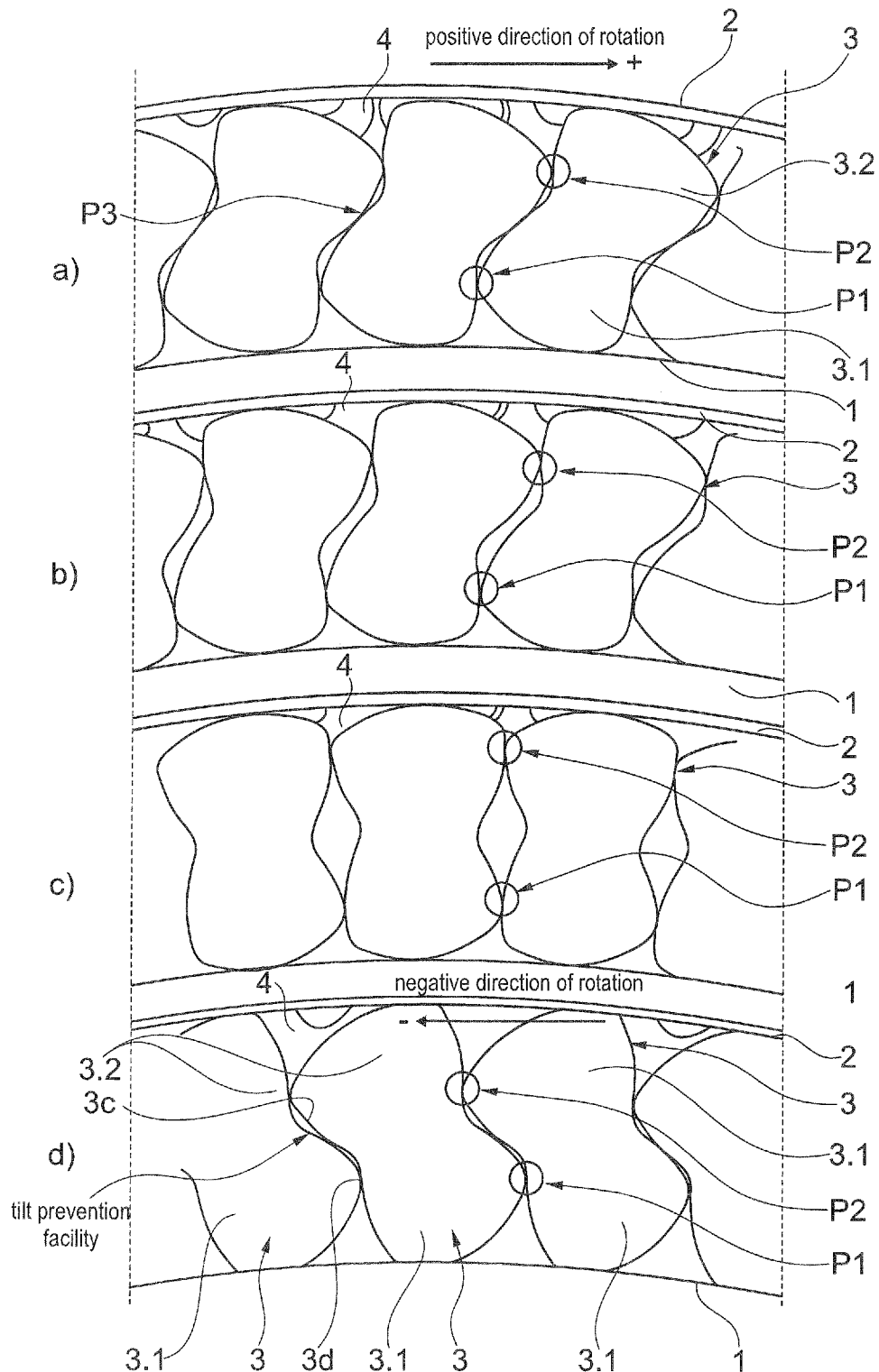
FIG. 2 shows the freewheel in different operating positions.

The freewheel is illustrated in different operating positions, from an impact position to a maximum torque, in the individual images a) to d) of FIG. 2.

Here, the freewheel is composed of the inner ring 1, the outer ring 2, the clamping bodies 3 arranged in between, and of a meandering spring 4 which engages into a groove (not visible here) of the clamping bodies 3 and loads said clamping bodies radially inward in the direction of the inner ring 1.

Illustration a) of FIG. 2 shows the impact position in which, as a result of a positive acceleration +, the clamping bodies 3 have been pivoted such that the head region 3.1 thereof has been pivoted in the direction of the positive acceleration (in this case, to the right). The clamping bodies 3 move with their contact surfaces 3a away from the inner ring 1, as a result of which a clearance between the outer and inner rings 2, 1 is ensured and damping is generated. In said positive direction of rotation +, the adjacent clamping elements 3 bear against one another both in the foot region 3.1 at a first guide point P1 and also in the head region 3.2 at a second guide point P2 (linear contact is generated over the length of the clamping bodies 3). On the opposite side, contact is generated at an impact point P3, which promotes the lifting of the clamping bodies 3.

b) shows the nominal position of the clamping bodies 3 with the first guide point P1 and the second guide point P2.

c) shows a position of the clamping bodies 3 for transmitting an average torque between the outer ring 2 and inner ring 1, wherein the first guide point P1 has been "displaced" inward and the second guide point P2 has been "displaced" outward.

d) shows the position for transmitting the maximum torque with a negative acceleration −, as a result of which the head region 3.2 of the clamping bodies 3 has in this case been pivoted to the left and is pressed with its contact surfaces 3a and 3b against the inner ring 1 and outer ring 2 and therefore maximum torques can be transmitted between the outer and inner rings 2, 1. During the pivoting movement of the clamping body 3, the convexly rounded first contact surface 3a rolls on the inner ring 1 and the convexly curved second contact surface 3b rolls on the outer ring 2. Also, in the position in illustration d) in FIG. 2, of the adjacent clamping bodies 3, the foot regions 2.1 are in contact at a first guide point P1 and the head regions 3.2 are in contact at a second guide point P2.

Furthermore, in FIG. 2, illustration d), a tilt prevention facility for the clamping bodies 3 is realized since the abutment surface 3d of the head region 3.2 of a clamping body 3 abuts against the abutment surface 3c of the foot region 3.1 of the clamping body 3 arranged—before it—in the negative direction of rotation, and can thereby move no further radially inward.

During the entire pivoting movement of the pivoting bodies 3 from a positive direction of rotation to a negative direction of rotation and vice versa, therefore, contact between the adjacent clamping bodies 3 at the two contact points P1, P2 is always ensured.

Figure 3:
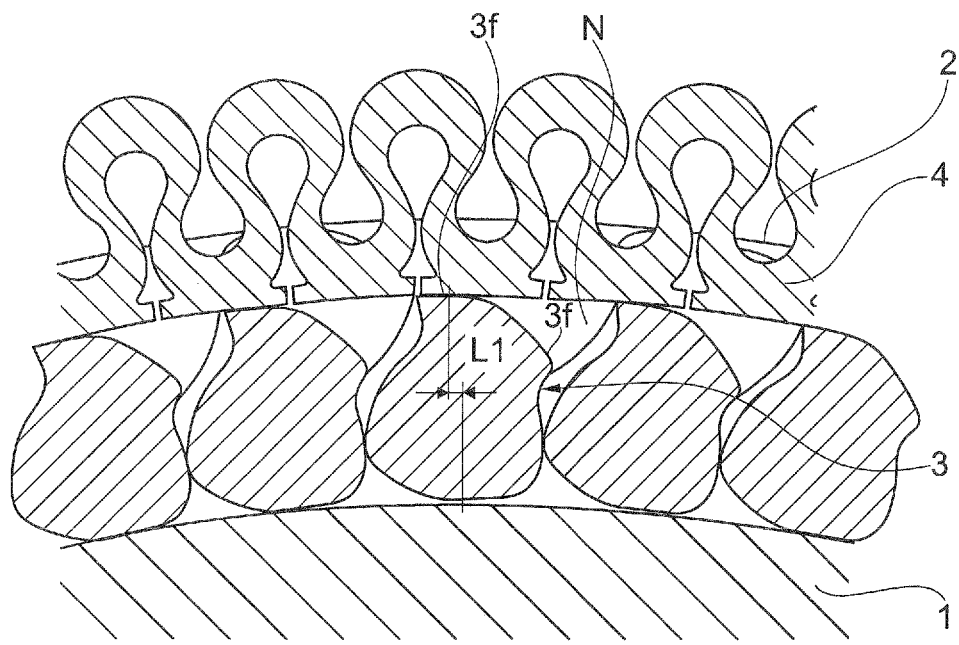
FIG. 3 shows a part of a cross section of the freewheel in the region of the groove of the clamping bodies in the nominal position.
Figure 4:
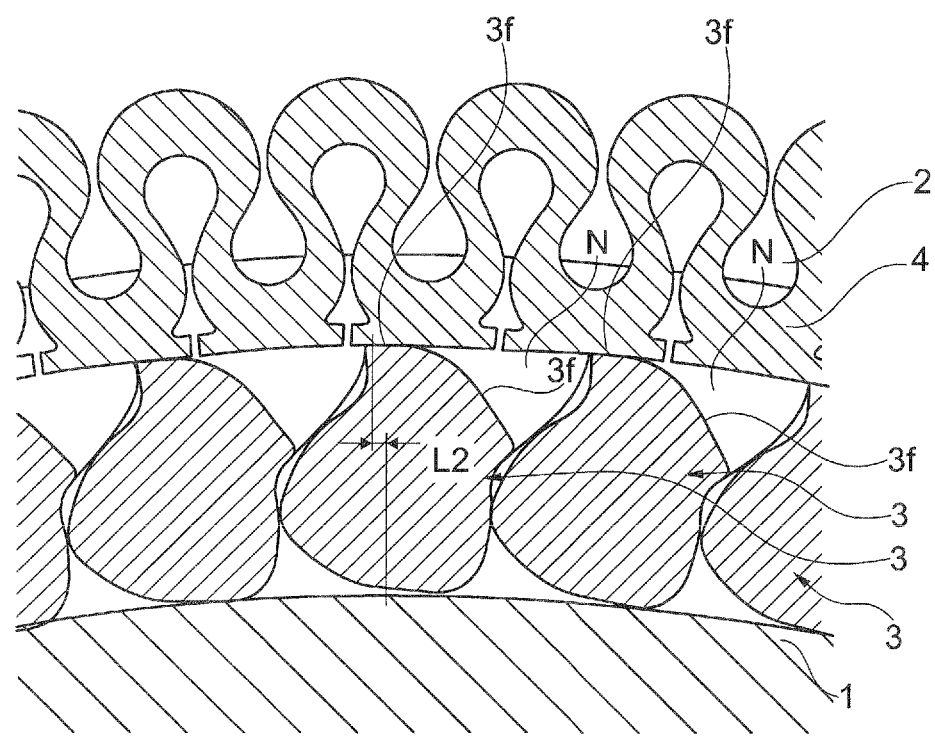
FIG. 4 shows a part of a cross section of the freewheel in the region of the groove of the clamping bodies in the impact position.

The detail of a cross section of the freewheel in the region of the spring engagement groove N of the clamping bodies 3 is shown in the nominal position in FIG. 3, and in the impact position in FIG. 4. It can be seen from FIGS. 3 and 4 that the meandering spring 4 engages into the groove N and acts against the pressure surface 3f of the spring engagement groove N. The pressure surface 3f of the spring engagement groove N has the substantially rectilinear region 3f' shown in bold. In the nominal position as per FIG. 3, the rectilinear region 3f' bears almost completely against the inner contour of the meandering spring 4, and there is a resulting first lever arm of the meandering spring 4 with a length L1. If the clamping bodies 3 move into the impact position as per FIG. 4, the lever arm of the meandering spring 4 is increased to the length L2 by the straight-ending profile 3f' of the pressure surface 3f, as per FIG. 4. In this way, the uprighting moment on the clamping bodies 3 becomes greater, which assists the clamping bodies 3 in better overcoming the possible jamming as a result of the impact, and the adherence to one another as a result of the lubricating oil. The lever arm increase must not act in the nominal contact region, in order to keep the drag torques low and thereby keep efficiency high. As a result of the specially configured cycloidal form of the clamping bodies in the head region and foot region, there is a defined constant spacing between the clamping body heads and feet in all operating points, as a result of which the formation of an oil film for lubrication is ensured. As a result of the novel geometry, the clamping bodies have less freedom of movement, as a result of which tilting is prevented. Furthermore, the clamping bodies are driven by the others in this way even when the meandering or worm spring does not push some clamping bodies properly into the clamping gap of the inner ring as a result of the tolerance position. This means that all the clamping bodies are always reliably pressed simultaneously into the clamping gap.

LIST OF REFERENCE SYMBOLS

1 Inner Ring
2 Outer Ring
3 Clamping Bodies
3.1 Foot Region
3.2 Head Region
3*a* First Contact Surface
3*b* Second Contact Surface
3*c* First Abutment Surface
3*d* Second Abutment Surface
3*f* Pressure Surface
3*f'* Straight-Ending Region
4 Meandering Spring
B1 Width of the Foot Region
B2 Width of the Head Region
L1 Lever Arm of the Meandering Spring in the Nominal Position
L2 Lever Arm of the Meandering Spring in the Impact Position
N Spring Engagement Groove

The invention claimed is:

1. A freewheel for a crank-type CVT, comprising;
an inner ring;
an outer ring, Which is rotatable relative to the inner ring in at least one direction of rotation and which is arranged radially around the inner ring;
a plurality of clamping bodies which have a spring engagement groove, a head region and a foot region, the clamping bodies are arranged between the inner ring and the outer ring and the damping bodies are arranged circumferentially next to one another so that the clamping bodies bear against one another; and
an encircling spring engaging into the spring engagement groove and having a radially inwardly acting spring force that can load the clamping bodies in a direction of the inner ring,
wherein the damping bodies have a point of contact in the head region and a point of contact in the foot region, which is separate from the point of contact in the head region, so as to be guided simultaneously both in the head region and in the foot region, and the clamping bodies are of cycloidal form in the head region and foot region,
wherein the encircling spring is a meandering spring and the meandering spring exerts a lever arm on the clamping bodies in an impact situation, which lever arm increases an uprighting moment on the clamping bodies, the lever arm being greater than a lever arm in a nominal contact region of the clamping bodies.

2. The freewheel as claimed in claim 1, wherein a defined constant spacing exists between the head region and the foot region of adjacent clamping bodies.

3. The freewheel as claimed in claim 1, wherein the clamping bodies have a width in the head region and the clamping bodies have a width in the foot region, and the width of the clamping bodies in the head region is greater than the width of the clamping bodies in the foot region.

4. The freewheel as claimed in claim 1, wherein two guide points are formed between adjacent clamping bodies in a freewheel direction of rotation and one impact point is formed between adjacent clamping bodies in a direction of rotation opposite the freewheel direction of rotation.

5. The freewheel as claimed in claim 1, wherein the spring engagement groove, in order to increase the lever arm in the impact situation, has a pressure surface for the encircling spring, and the pressure surface is substantially convexly curved in a freewheel direction of rotation, 6. The freewheel as claimed in claim 5, wherein the pressure surface of the spring engagement groove slopes downward/is inclined in a radially inward direction of the inner ring in the freewheel direction of rotation.

* * * * *